United States Patent
R et al.

(10) Patent No.: US 10,929,285 B2
(45) Date of Patent: Feb. 23, 2021

(54) STORAGE SYSTEM AND METHOD FOR GENERATING A REVERSE MAP DURING A BACKGROUND OPERATION AND STORING IT IN A HOST MEMORY BUFFER

(71) Applicant: Western Digital Technologies, Inc., San Jose, CA (US)

(72) Inventors: Raviraj R, Bangalore (IN); Ritesh Tiwari, Bangalore (IN); Raghavendra Gopalakrishnan, Bengaluru (IN)

(73) Assignee: Western Digital Technologies, Inc., San Jose, CA (US)

(*) Notice: Subject to any disclaimer, the term of this patent is extended or adjusted under 35 U.S.C. 154(b) by 229 days.

(21) Appl. No.: 15/906,914

(22) Filed: Feb. 27, 2018

(65) Prior Publication Data

US 2019/0266079 A1    Aug. 29, 2019

(51) Int. Cl.
*G06F 3/06* (2006.01)
*G06F 12/02* (2006.01)

(52) U.S. Cl.
CPC .......... *G06F 12/0246* (2013.01); *G06F 3/061* (2013.01); *G06F 3/064* (2013.01); *G06F 3/0604* (2013.01); *G06F 3/0656* (2013.01); *G06F 3/0679* (2013.01); *G06F 12/0253* (2013.01)

(58) Field of Classification Search
CPC .... G06F 12/0246; G06F 3/0604; G06F 3/061; G06F 3/064; G06F 3/0656; G06F 3/0679; G06F 12/0253
See application file for complete search history.

(56) References Cited

U.S. PATENT DOCUMENTS

| 8,407,449 B1* | 3/2013 | Colon | G06F 12/0246 711/103 |
| 2014/0089568 A1* | 3/2014 | Chung | G06F 12/0246 711/103 |
| 2014/0215129 A1* | 7/2014 | Kuzmin | G06F 12/0246 711/103 |
| 2014/0223079 A1* | 8/2014 | Zhang | G06F 12/0246 711/103 |
| 2015/0026389 A1* | 1/2015 | Li | G06F 12/0246 711/103 |
| 2017/0322731 A1* | 11/2017 | Lee | G06F 12/0246 |
| 2018/0039578 A1* | 2/2018 | Yun | G06F 12/1009 |

* cited by examiner

*Primary Examiner* — Charles Rones
*Assistant Examiner* — Han V Doan
(74) *Attorney, Agent, or Firm* — Dickinson Wright PLLC; Steven Hurles

(57) ABSTRACT

A storage system and method are disclosed for generating a reverse map during a background operation and storing it in a host memory buffer. In one embodiment, a storage system is provided comprising a memory and a controller. The controller is configured to generate a physical-to-logical address map for at least part of the memory as a background operation and send the physical-to-logical address map to a host for storage in volatile memory in the host.

14 Claims, 7 Drawing Sheets

STORAGE SYSTEM AND METHOD FOR GENERATING A REVERSE MAP DURING A BACKGROUND OPERATION AND STORING IT IN A HOST MEMORY BUFFER

BACKGROUND

Some storage systems, such as solid-state drives (SSDs), contain a non-volatile memory that is organized by physical addresses. Over time, data stored in some physical memory locations may become invalid, and garbage collection can be used to consolidate valid data from various physical memory locations. Considering the typical lifetime of a solid state device, garbage collection can play an important role in meeting performance requirements. Some garbage collection operations use a physical-to-logical address map (a "reverse map") to identify which memory blocks need to be relocated. Some storage systems dynamically create the physical-to-logical address map during host data write operations and store the physical-to-logical address map in non-volatile memory (e.g., NAND) in the storage system for later use during a garbage collection operation.

DETAILED DESCRIPTION

Overview

Figure 1A:
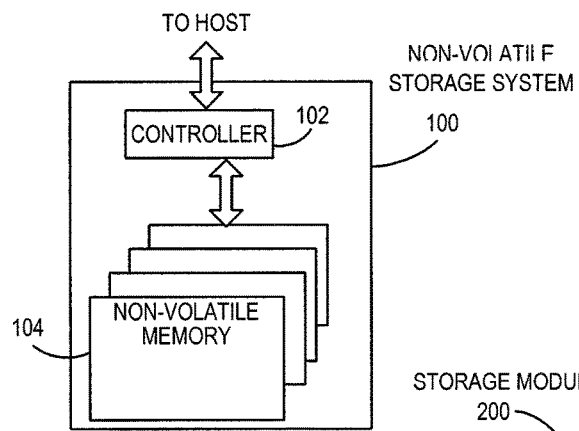
FIG. 1A is a block diagram of a non-volatile storage system of an embodiment.

By way of introduction, the below embodiments relate to a storage system and method for generating a reverse map during a background operation and storing it in a host memory buffer. In one embodiment, a storage system is provided comprising a memory and a controller. The controller is configured to generate a physical-to-logical address map for at least part of the memory as a background operation; and send the physical-to-logical address map to a host for storage in volatile memory in the host.

In some embodiments, the storage system further comprises a plurality of buffers, and the controller is further configured to store different portions of the physical-to-logical address map in different ones of the plurality of buffers before sending them to the host.

In some embodiments, the controller is further configured to send a first portion of the physical-to-logical address map stored in a first buffer to the host while storing a second portion of the physical-to-logical address map in a second buffer.

In some embodiments, the memory comprises a plurality of blocks, each block associated with a respective validity count, and the controller is configured to identify which blocks to generate the physical-to-logical address map for based on the validity count associated with each block.

In some embodiments, the memory comprises a plurality of blocks, each block associated with a respective program-erase count, and wherein the controller is configured to identify which blocks to generate the physical-to-logical address map for based on the program-erase count associated with each block.

In some embodiments, the memory comprises a plurality of memory management units at physical addresses in the memory, wherein each memory management unit stores a logical block address for that memory management unit, and wherein the controller is configured to generate the physical-to-logical address map by reading the logical block address stored in each of the memory management units for the at least part of the memory.

In some embodiments, the controller is further configured to receive the physical-to-logical address map back from the host for use in a garbage collection operation in the memory.

In some embodiments, the controller is further configured to receive the physical-to-logical address map back from the host for use in a wear-leveling operation in the memory.

In some embodiments, the memory comprises a three-dimensional memory.

In some embodiments, the storage system is embedded in the host.

In some embodiments, the storage system comprises a solid state drive (SSD).

In another embodiment, a method is provided that is performed in a storage system comprising a memory. The method comprises creating a reverse map for at least part of the memory during host idle time; and sending the reverse map to a host for storage in a host memory buffer.

In some embodiments, the method further comprises selecting the at least part of the memory based on one or both of the following: validity count and program-erase count.

In some embodiments, the reverse map is created by scanning the at least part of the memory for associated logical block addresses.

In some embodiments, creating the reverse map and sending the request to the host are performed in a pipeline fashion for different portions of the at least part of the memory.

In some embodiments, the memory comprises a three-dimensional memory.

In another embodiment, a storage system is provided comprising a memory; and one or both of the following: means for generating a physical-to-logical address map for at least part of the memory as a background operation; and means for storing the physical-to-logical address map in volatile memory in a host.

In some embodiments, the storage system comprises both the means for generating and the means for storing.

In some embodiments, the memory comprises a three-dimensional memory.

In some embodiments, the storage system comprises a solid state drive (SSD).

Other embodiments are possible, and each of the embodiments can be used alone or together in combination. Accordingly, various embodiments will now be described with reference to the attached drawings.

Exemplary Embodiments

Figure 1B:
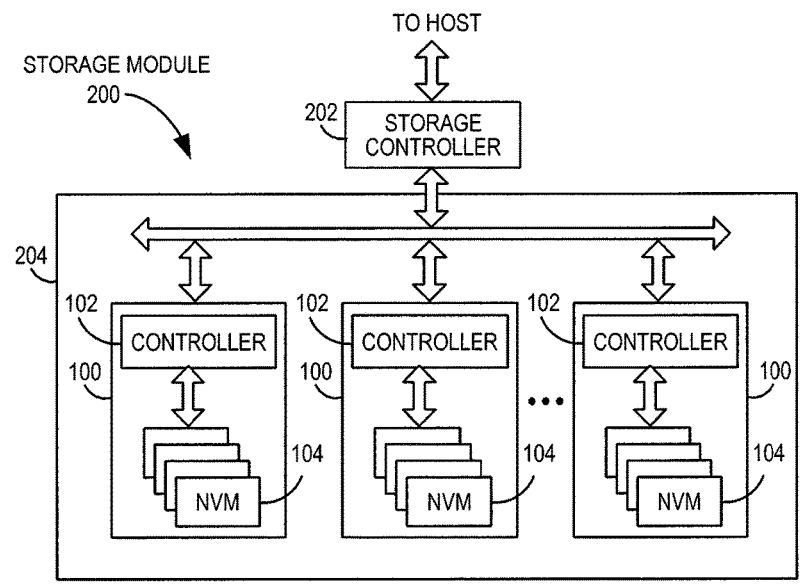
FIG. 1B is a block diagram illustrating a storage module of an embodiment.
Figure 1C:
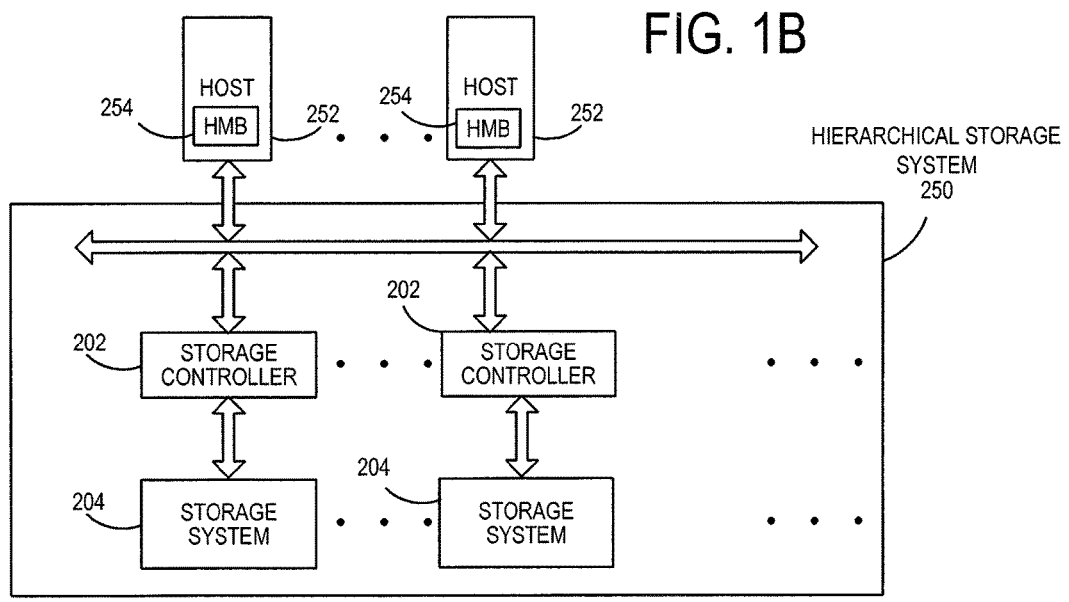
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, 800, or 1000. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment the host 252 has a host memory buffer 254, which will be discussed in more detail below. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
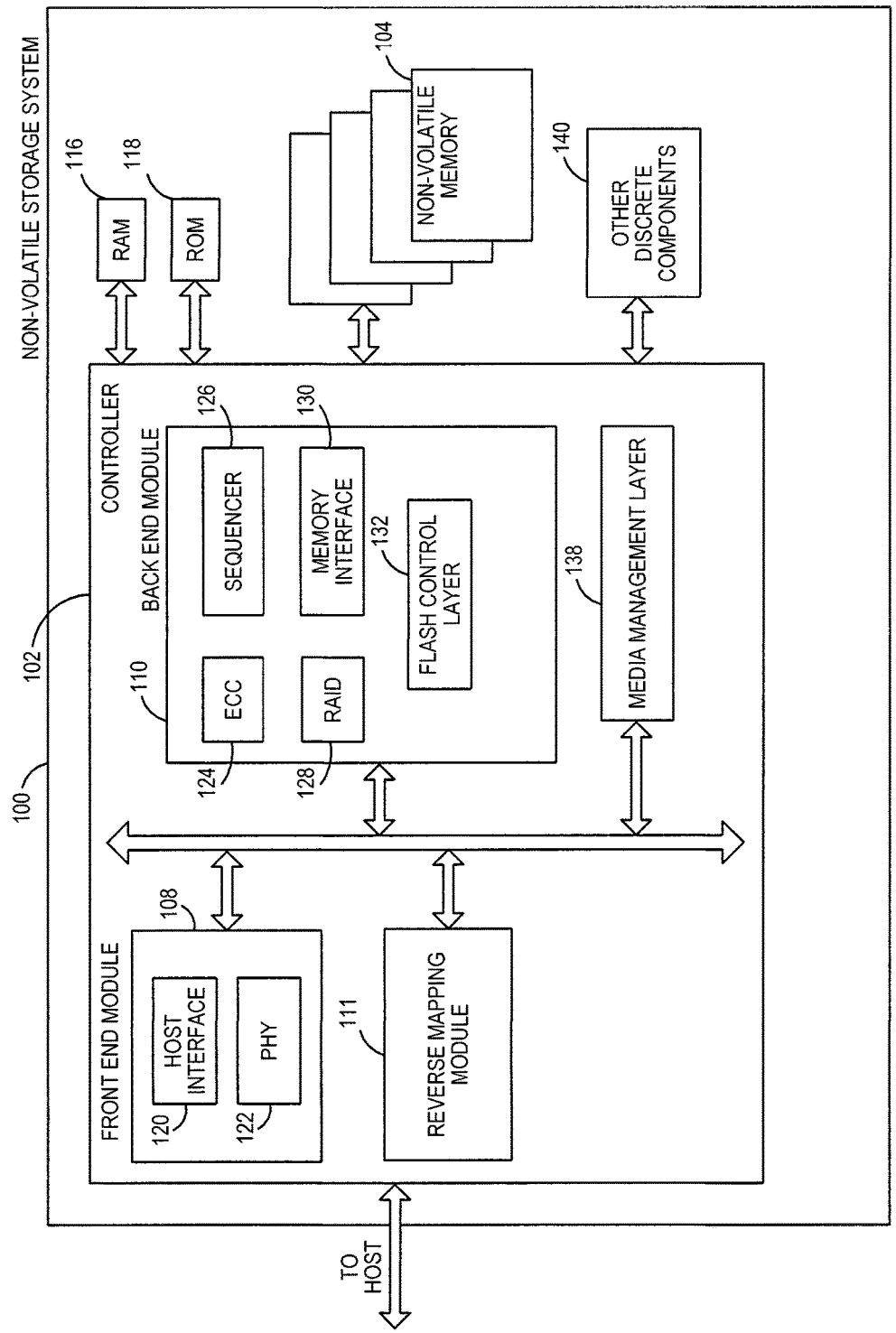
FIG. 2A is a block diagram illustrating components of the controller of the non-volatile storage system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a reverse mapping module 111, which is configured to construct a physical-to-logical address map. Implementation of the functionality of these modules will be discussed in more detail below.

Referring again to modules of the controller 102, a buffer manager/bus controller (not shown) manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 (also known as a flash interface module) generates command sequences, such as program and erase command sequences, and schedules those sequences to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, 800 or 1000 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module (not shown), media management layer 138 and buffer management/bus controller (not shown) are optional components that are not necessary in the controller 102.

Figure 2B:
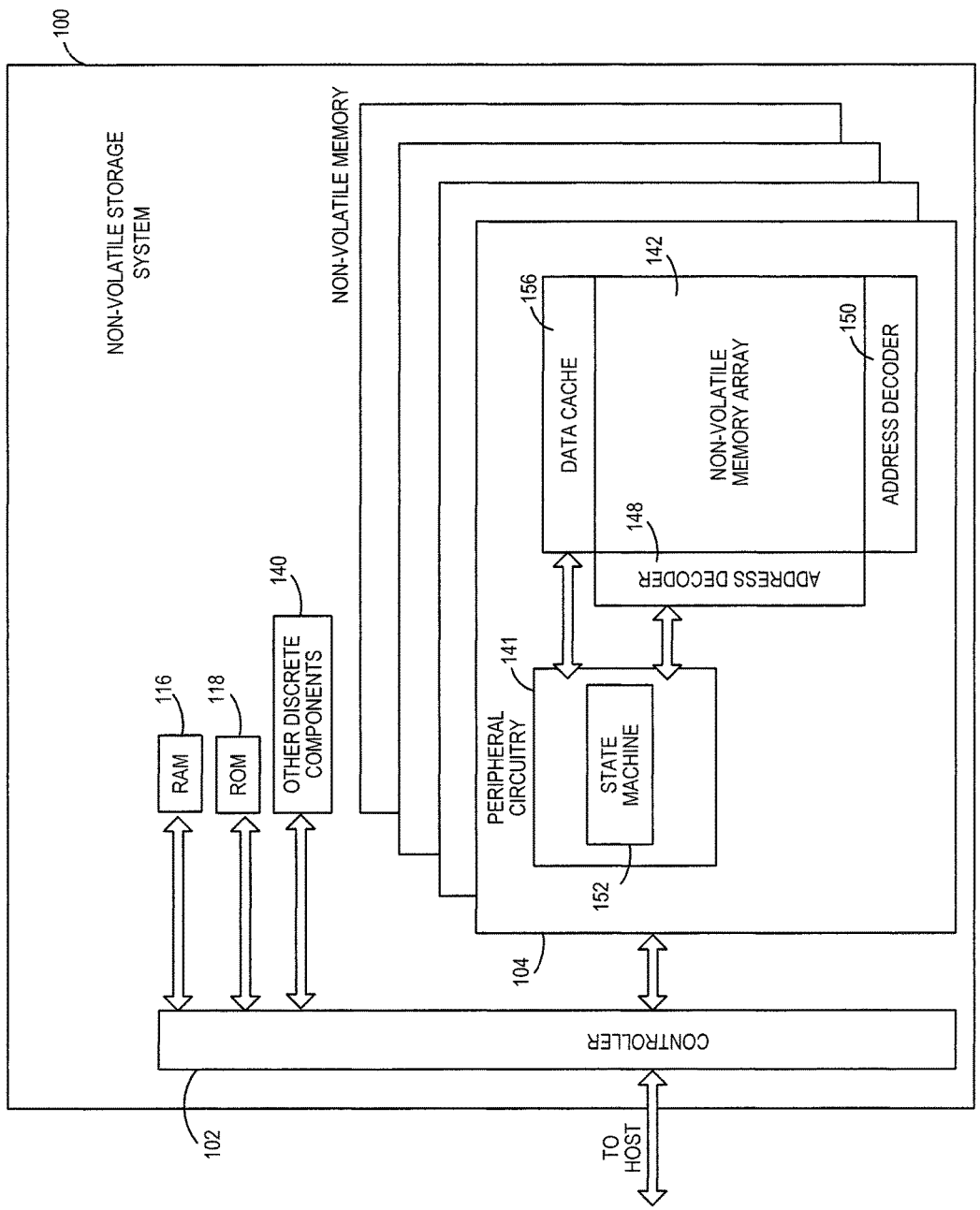
FIG. 2B is a block diagram illustrating components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data.

Peripheral circuitry 141 includes a state machine 152 that provides status information to controller 102. The circuitry 141 can provide additional functionality, which will be described in more detail below. In general, "circuitry" can include one or more components and be a pure hardware implementation and/or a combined hardware/software (or firmware) implementation. Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

In this embodiment, the non-volatile memory 104 of the storage system 100 is organized by physical addresses. The host 252 uses logical addresses to read data from and/or write data to the storage system 100, and the storage system 100 stores a logical-to-physical address map that the controller 102 uses to translate a logical address from the host (e.g., in a write or read command) into a physical address of the non-volatile memory 104. Any suitable form of a logical-to-physical address map can be used.

As noted above, over time, data stored in some physical memory locations may become invalid, and garbage collection (sometimes referred to herein as a "relocation operation") can be used to consolidate valid data from various physical memory locations (e.g., by moving valid data from a source block to a destination block). Considering the typical lifetime of a solid state device, garbage collection can play an important role in meeting performance requirements. In general, garbage collection is a process that collects the valid parts of used memory blocks (ignoring the invalidated parts) and moves them to a new block. When a block is fully invalidated, it can be returned to a free block pool. Garbage collection can be controlled by keeping a "valid counter" for each block to track the number of valid flash management units in the block and/or by a program/erase cycle counter to monitor the block's endurance. A garbage collection algorithm can choose which block should be "collected" next by checking which block has the lowest "valid counter," the lowest program/erase cycle counter, and/or a program/erase cycle counter that is below average.

A garbage collection algorithm can also use a physical-to-logical address map to identify which memory blocks need to be relocated. The physical-to-logical address map will sometimes be referred to herein as a "reverse map" ("reverse" referring to the fact that it is a physical-to-logical address map, instead of a logical-to-physical address map) or an inverse storage address table (iSAT). Any suitable form of a physical-to-logical address map can be used. Also, the terms "map" and "table" will be used interchangeably herein.

Some storage systems dynamically create the physical-to-logical address map during host data write operations and store the physical-to-logical address map in non-volatile memory (e.g., NAND) in the storage system for later use during a garbage collection operation. While it is faster for the storage system to access the physical-to-logical address map if it is stored in the storage system's volatile memory (e.g., SRAM), volatile memory can be a limited resource in the storage system. Thus, availability of volatile memory in the storage system can be a key factor for garbage collection efficiency.

The following embodiments provide improved performance during garbage collection by changing where the physical-to-logical address map is stored and/or when the physical-to-logical address map is generated. For example, in one embodiment, volatile memory in the host 252 (sometimes referred to as a "host memory buffer (HMB)" 254 (see FIG. 1C)) is used instead of or in addition to the non-volatile memory 104 in the storage system 100 to store the physical-to-logical address map. This can improve performance, as it can decrease the need to access the slower, non-volatile memory 104. For example, the below table shows typical access latency associated with different memory types in storage system 100 and host 252.

| Memory Type | Access Latency |
|---|---|
| Internal SRAM | 200-300 ns |
| Host Memory Buffer | 2-5.9 μs |
| NAND | 50-200 μs |

As seen by this table, the fastest memory in this example is typically internal SRAM with access latency of 200-300 ns; thus, it is the best memory of these three types in terms of performance. The typical access latency of the host memory buffer 254 in this example is 2-5.9 μs, which is significantly less than the NAND access latency and, hence, can be a good candidate for intermediate storage of the flash translation layer mapping structures, such as the physical-to-logical address map. Accordingly, in one embodiment, the storage system 100 uses the host memory buffer 254 (instead of the non-volatile memory 104) to store some or all of the physical-to-logical address map.

As mentioned above, another improvement that can be used relates to when the physical-to-logical address map is generated. One of the first steps in garbage collection/relocation is identifying the relevant parts of the data in a source block that need to be relocated to a destination block. The identification process can be done, for example, by scanning the host data just before relocation or by storing block validity information in a separate control data. As noted above, some memory systems generate the physical-to-logical address map dynamically as host data writes are received. The advantage of this approach is that, when garbage collection is needed, the storage system does not need to spend time generating the physical-to-logical address map (e.g., using a source block scanning procedure) because the map has already been created. However, this approach has some disadvantages. For example, because the physical-to-logical address map is created for all written blocks and not just for the blocks that need to undergo garbage collection, the physical-to-logical address map may be much larger than needed, requiring more storage space. As an illustration of this, consider the situation in which meta data for each open block needs to be accumulated before being written as part of the control block. If the storage system has about eight open blocks and writes in terms of a die page of 32K of reverse mapping in control block, this would take ~288 KB of volatile memory space to store this information. This can amount to increased control data storage in the non-volatile memory 104. For example, if four bytes of information is needed from each memory management unit (e.g., flash management unit (FMU)), in the case of BICS4, 512 GB would be needed to store this information. Further, generating the physical-to-logical address map dynamically as host data writes are received can require additional processing that can negatively impact write performance.

As another approach, instead of generating the physical-to-logical address map dynamically as host data writes are received, the storage system can generate the physical-to-logical address map as needed (e.g., as part of the garbage collection process). The advantage of this approach is that it does not require additional volatile and non-volatile memory space to store this information during a host write. However, when the physical-to-logical address map is needed (e.g., during garbage collection), the storage system would need to spend time scanning a source block to create the physical-to-logical address map in order to verify the validity of memory management units (e.g., FMUs) in the block. This can result in performance degradation.

In one embodiment, a different approach is used; namely, the storage system 100 (e.g., the controller 102 generally or the reverse mapping module 111) generates the physical-to-logical address map (e.g., by scanning validity information for block(s) of memory) as part of a background operation. As used herein, a background operation is in contrast to a foreground operation, which is an operation that originates from the host 252 and is sent to the storage system 100 (e.g., over a bus) for execution. Examples of a foreground operation include, but are not limited to, a host read, write, and erase command. In some embodiments, a foreground operation is performed to completion by the storage system's controller 102 without being interrupted and has a predetermined completion time. In contrast, a background operation is an operation that can be performed whenever possible when no host/foreground commands are currently being executed and/or no host commands are being received by the storage system 100. This may be referred to herein as "host idle time." The host 252 itself may or may not be idle during "host idle time," in that the host 252 may be performing activities (e.g., not in low-power mode). However, during "host idle time," the storage system 100 is not performing an operation received from the host 252.

In some embodiments, a background operation can be preempted/interrupted by a foreground command and continued at a later time. Unlike foreground commands which can have a predetermined completion time, some background operations can have an uncertain completion time, depending on how much they are interrupted by foreground commands. Examples of other background operations can include, but are not limited to, garbage collection, read threshold calibration, time tag split or union, relocation of data to multi-level cells (such as a triple-level cell (TLC) or a quad-level cell (QLC)), data scrambling, column replacement, handling write aborts and/or program failures (via safe zones), read scrubbing, wear leveling, bad block and/or spare block management, error detection code (EDC) functionality, status functionality, encryption functionality, and error recovery.

Figure 3:
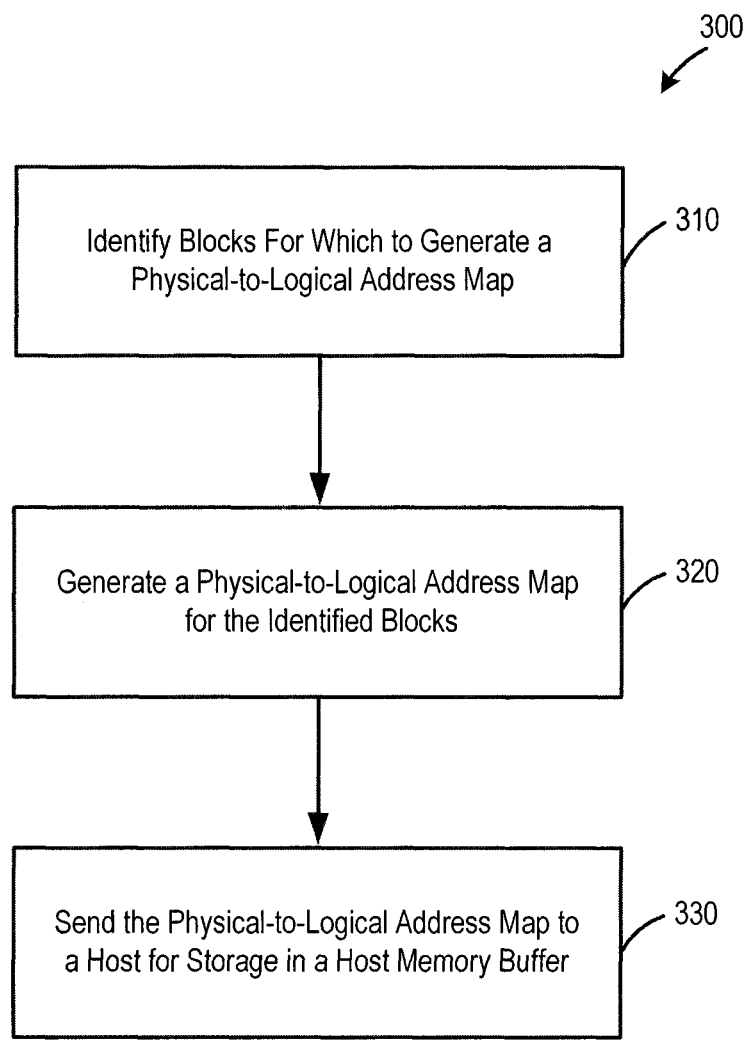
FIG. 3 is a flow chart of a method for generating a reverse map during a background operation and storing it in a host memory buffer.

Turning again to the drawings, FIG. 3 is a flow chart 300 of a method of an embodiment for generating a reverse map during a background operation and storing it in a host memory buffer. The algorithm shown in this flow chart 300 can be executed in any suitable component in the storage system 100 (e.g., firmware in the controller 102, the reverse mapping module 111, etc.). This method will be illustrated with a storage system 100 having the following configuration:

Device Capacity: 512 GB
  Die Configuration: 256 Gbit (32 GB)
  Single-Level Cell (SLC) Physical Block Size: 6 MB
  SLC Metablock Size: 4 Physical blocks: 18 MB
  SLC Jumbo Block Size: 4 Metablocks: 192 MB
  Triple-Level Cell (TLC) Jumbo Block Size: 576 MB where a "jumbo block" is a set of metablocks, and where a "metablock" is a set of physical blocks that can be operated in parallel. It should be noted that this is merely one example implementation, and other sizes, granularity, and terminology can be used. Accordingly, details of this example should not be read into the claims unless expressly recited therein.

As shown in the flow chart 300 in FIG. 3, the controller 102 first identifies blocks for which to generate a physical-to-logical address map (act 310). By identifying the relevant blocks, the storage system 100 avoids needlessly consuming time and power to map block that are not relevant. For example, if the physical-to-logical address map will later be used as part of a garbage collection operation, the physicalto-logical address map only needs to contain entries for the blocks that will likely be relocated. Entries of other blocks will likely not be needed. Alternatively, the controller 102 can generate a physical-to-logical address map for more (e.g., all) blocks in the memory 104.

Figure 4:
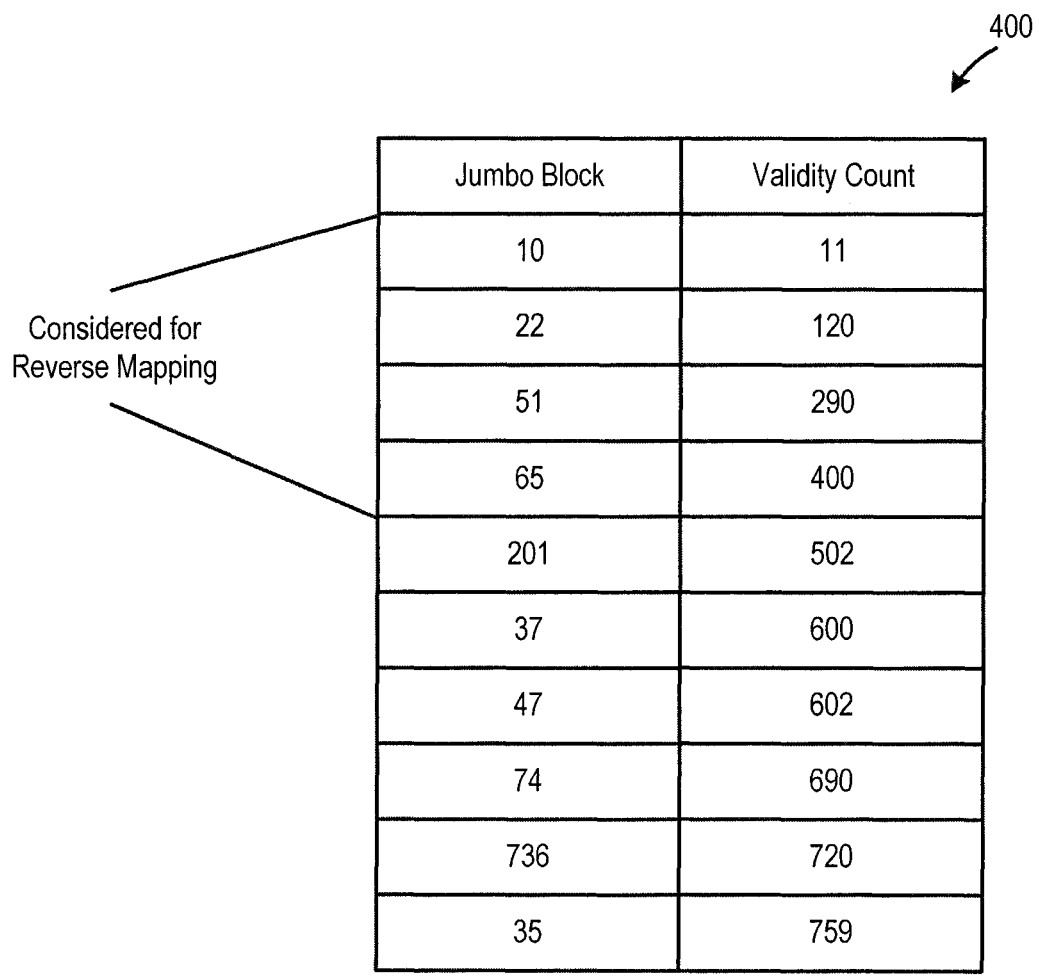
FIG. 4 is an illustration of a validity count list of an embodiment.

The controller 102 can identify blocks for which to generate a physical-to-logical address map in any suitable way. For example, the storage system 100 can store a table 400 (see FIG. 4) that lists jumbo blocks and the corresponding validity count (e.g., number of blocks in the jumbo block that are valid). In this example, the jumbo blocks are sorted in the order of the validity count. The table 400 in this example is dynamic, in that if a jumbo block is found with a lesser validity count, it will be inserted into the table 400 at the appropriate location, and the jumbo block with the highest validity count will be replaced. It should be noted that the jumbo blocks can be sorted in a different order, and a data structure other than a list can be used. The controller 102 can chose those jumbo blocks that have a validity count under a certain threshold for which to generate a physical-to-logical address map. In this example, the blocks with the four lowest validity counts are chosen as the most-probable candidates for relocation.

Figure 5:
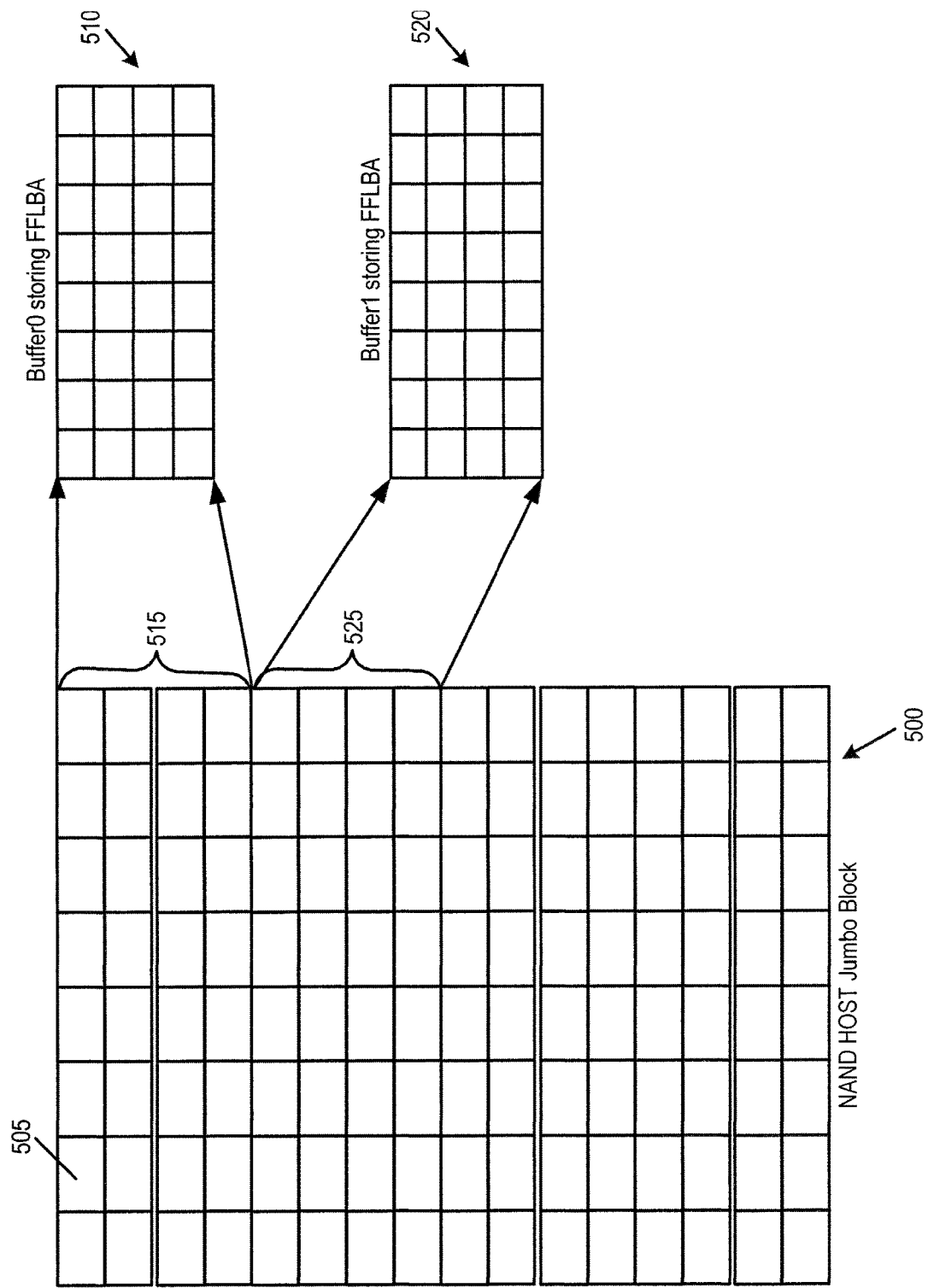
FIG. 5 is a diagram illustrating the use of a plurality of buffers to store a reverse map of an embodiment.

Next, the controller 102 generates a physical-to-logical address map for the identified blocks (act 320). The controller 102 can generate the physical-to-logical address map in any suitable way. For example, as shown in FIG. 5, in one embodiment, a jumbo block 500 is organized as a plurality of memory management units (e.g., flash management units (FMUs)) 505. Each memory management unit is located at a unique physical address and stores (e.g., in a header or another location) an identification of the logical block address (LBA) currently associated with memory management unit. As a given memory management unit can be associated with different logical block addresses at different times, the logical block address stored in the memory management unit can change over time.

At the time the physical-to-logical address map is generated, the controller 107 scans each memory management unit in the block to read its associated logical block address from the header (or other location) and then, in this embodiment, temporarily stores the associated logical block address (optionally, along with the associated physical addresses of the memory management unit) in one or more staging buffers 510, 520 in the storage system 100 (e.g., in the SRAM 116). For example, the controller 102 can write a physical-address/logical-block pair in each location in the buffers 510, 520, or just the logical block addresses can be written in the locations in the buffers 510, 520 (e.g., if there is an implied association between a buffer location and a physical address). In one embodiment, each entry in the buffers 510, 520 contains four bytes of data, which indicates the logical block address stored in the memory management unit read from the jumbo block 500.

When more than one buffer is used, the multiple buffers can be used to scan multiple parts of the jumbo block (e.g., based on SRAM 116 availability). For example, in the embodiment shown in FIG. 5, the first buffer 510 ("Buffer0") is used to store logical block addresses for portion 515 of the block 500, and the second buffer 520 ("Buffer1") is used to store logical block addresses for portion 525 of the block 500. In this particular implementation, logical block addresses stored in the buffers 510, 520 are referred to as flat FMU logical block addresses ("FFLBAs"), as different partitions of blocks can have their own set of logical block addresses. Again, this is merely one example implementation, and other organizational schemes can be used.

Figure 6:
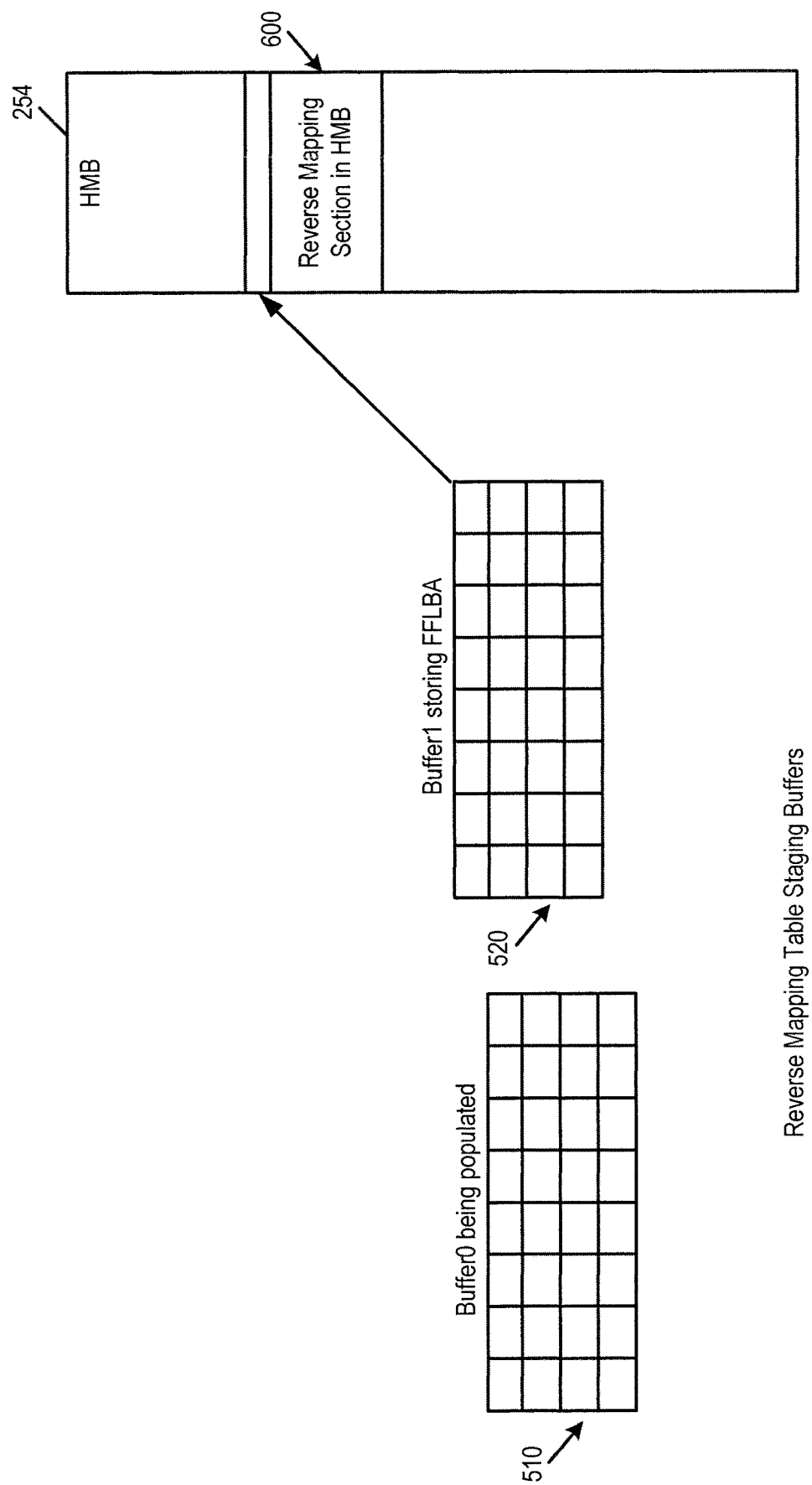
FIG. 6 is a diagram illustrating sending a reverse map to a host memory buffer of an embodiment.

After some or all of the physical-to-logical address map is generated, the controller 102 sends the physical-to-logical address map to the host 252 for storage in a host memory buffer 254 (act 330). For example, as shown in FIG. 6, the controller 102 can use a pipeline operation to copy the physical-to-logical address map to the HMB 254. Here, one buffer 520 stores the physical-to-logical address map for one portion of the block 500 and transfers that map to the host 252 for storage in the HMB 254 as the other buffer 510 is used to store the physical-to-logical address map for another portion of the block 500 currently being scanned. The request that the controller 102 sends to the host 252 to store the physical-to-logical address map can be a special command, so the host 252 knows that the subsequent data should be stored in the HMB 254 (as opposed to another memory). However, other syntaxes can be used. Also, instead of the controller 102 initiating the transfer, the host 252 can request the physical-to-logical address map.

At a later time, the storage system 100 can retrieve the physical-to-logical address map from the host 252 for processing (e.g., during a garbage collection operation) and/or for storage in the RAM 116, non-volatile memory 104, or another location in the storage system 100.

As noted above, in one embodiment, the controller 102 identifies blocks that are potential candidates for relocation (e.g., using a validity count table), creates the physical-to-logical address map for those blocks, and stores the created map in the HMB 254 "in advance" (e.g., before garbage collection is performed) and as a background operation during host idle time. This provides several advantages. For example, by pre-selecting the blocks that need to be mapped, this embodiment saves time and resources as compared to the approach of dynamically generating the physical-to-logical address map for all blocks as host data writes are received. Further, by storing the physical-to-logical address map in the HMB 254 instead of the non-volatile memory 104, this embodiment decreases the time needed to access the physical-to-logical address map, which also improves performance. And by using the HMB 254 instead of RAM 116 to store the physical-to-logical address map, this embodiment can result in a reduced RAM footprint, thereby providing performance gains in cost-effective products. This can be especially advantageous as NAND block size increases across NAND technology because, in some systems, as NAND block size increases, so does jumbo block size. So, if relocation operates in units of jumbo blocks, the RAM requirement for the relocation operation would also increase, which can impact controller cost. Conversely, if the size of the RAM does not increase, performance during relocation would be reduced.

The following performance and size calculation will illustrate these advantages. As with the various details mentioned above, it should be noted that the specific configuration and timing details mentioned here are merely examples and should not be read into the claims unless expressly recited therein. In this example, there are 98,304 FMUs per TLC jumbo block. This requires 384 KB in the HMB 254 per jumbo block. Since this is a large memory space, it is handled in chunks of smaller memory units (e.g., 32 KB). If the reverse table is maintained for five closed blocks in the memory 104, the reverse map size in the HMB 254 would be about ~1.8 MB.

Let's now compare the total relocation time in the situation where the physical-to-logical address map is generated on-the-fly when needed for garbage collection versus in advance as a background operation. Assume an X3 sense time of 38 us and an X3 program time of 2 msec. For the on-the-fly (as-needed) approach using SRAM 116 to store the map, the total relocation time is calculated as:

Source Jumbo Block Scan to Read the Header Meta Information: 152 msec
Source Jumbo Block Read: 59 msec
Destination Jumbo Block Write: 552 msec
Total Relocation Time: 764 msec In contrast, in the "in advance" approach using the HMB 254 to store the map, instead of there being two reads of the source block (one to read the control data and the other to read the actual valid data from source block), the first part of the scan information is retrieved from the HMB 254 and only the second read is noticed from the source block. As such, the total relocation time is calculated as:

Time to Transfer from HMB 254 for a 384K Reverse Map: 480 usec
Source Jumbo Block Read: 59 msec
Destination Jumbo Block Write: 552 msec
Total Relocation Time: 611 msec Accordingly, in this example, there is a 25% improvement using the "in advance" scheme of this embodiment.

There are many alternatives that can be used with these embodiments. For example, while the about example had the reverse map generated as a background operation and stored in the HMB 254, each of these features can be used independently. That is, in other embodiments, the reverse map can be generated as a background operation but then stored in a location other than the HMB 254 (e.g., in the non-volatile memory 104 or in the RAM 116 of the storage system 100). Alternatively, the reverse map can be stored in the HMB 254 but generated as a non-background operation (e.g., during host data write operations or "on demand," such as in conjunction with the start of a garbage collection operation (foreground or background)).

Further, in the above examples, the generated reverse map was later retrieved from the HMB 254 for use with a garbage collection operation (e.g., as part of a dynamic relocation operation aimed at freeing up SLC/TLC blocks). However, it should be noted that other operations can use the generated reverse map. For example, in one alternate embodiment, the generated reverse map can be used in a wear-levelling scenario where the wear is uniformly distributed across non-volatile memory 104. In this alternate embodiment, instead of using the validity count to pre-select the blocks for the reverse map, a program-erase count for a block can be used.

Also, as noted above, the HMB 254 can be used to store all of the reverse map or some of the reverse map (e.g., when the reverse map is sent to the HMB 254 in a pipeline fashion). Accordingly, it should be understood that "map" (or "table") as used herein can refer to all or some of the map (table). Also, in some embodiments, other memories (e.g., RAM 116 and/or non-volatile memory 104 in the storage system 100 or a memory in another external device) can be used to store all or part of the reverse map. For example, it is possible for part of the reverse map to be stored in the RAM 116 of the storage system 100 and another part (and/or a duplicate part) of the reverse map to be stored in the HMB 254. This may occur, for example, if the HMB 254 is used as a "spillover" memory for the RAM 116. Further, in other embodiments, it may be desired to store some or all of the reverse map (or a copy thereof) in the non-volatile memory 104 in the storage system 100 in order to retain the reverse map even when power is removed from the storage system 100 or host 252.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), magnetoresistive random access memory ("MRAM"), phase-change memory ("PCM"), or other elements comprising semiconductor or other material capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage system comprising:
   a memory, comprising a plurality of memory management units at physical addresses in the memory, wherein each memory management unit stores a logical block address for that memory management unit;
   a controller configured to:
      determine a respective validity count for each of a plurality of blocks of the memory;
      generate, as a background operation, a physical-to-logical address map for one of the plurality of blocks of the memory, based on the respective validity count of the one of the plurality of blocks, by reading the logical block address stored in each of the memory management units for the at least part of the memory; and
      send the physical-to-logical address map to a host for storage in volatile memory in the host; and
   a plurality of buffers, wherein the controller is further configured to store different portions of the physical-to-logical address map in different ones of the plurality of buffers before sending the stored portions to the host.

2. The storage system of claim 1, wherein the controller is further configured to send a first portion of the physical-to-logical address map stored in a first buffer to the host while storing a second portion of the physical-to-logical address map in a second buffer.

3. The storage system according to claim 1, wherein the controller is further configured to receive the physical-to-logical address map from the host for use in a garbage collection operation in the memory.

4. The storage system according to claim 1, wherein the controller is further configured to receive the physical-to-logical address map from the host for use in a wear-leveling operation in the memory.

5. The storage system of claim 1, wherein the memory comprises a three-dimensional memory.

6. The storage system of claim 1, wherein the storage system is embedded in the host.

7. The storage system of claim 1, wherein the storage system comprises a solid state drive (SSD).

8. A method comprising:
   performing the following in a storage system comprising a memory, wherein the memory comprises a plurality of memory management units at physical addresses in the memory, wherein each memory management unit stores a logical block address for that memory management unit:
      determine a respective validity count for each of the plurality of blocks of the memory;

creating, during a host idle time, a reverse map for one of the plurality of blocks of the memory, based on the respective validity count of the one of the plurality of blocks, by reading the logical block address stored in each of the memory management units for the at least part of the memory;

storing different portions of the reverse map in different ones of a plurality of buffers; and sending the reverse map from the different ones of the plurality of buffers to a host for storage in a host memory buffer.

9. The method of claim 8, wherein the reverse map is created by scanning the one of the plurality of blocks for associated logical block addresses.

10. The method of claim 8, wherein creating the reverse map and sending the reverse map to the host are performed in a pipeline fashion for different portions of the one of the plurality of blocks.

11. The method of claim 8, wherein the memory comprises a three-dimensional memory.

12. A storage system comprising:

a memory, comprising a plurality of memory management units at physical addresses in the memory, wherein each memory management unit stores a logical block address for that memory management unit;

means for determining a respective validity count for each of a plurality of blocks of the memory;

means for generating, as a background operation, a physical-to-logical address map for one of the plurality of blocks of the memory, based on the respective validity count of the one of the plurality of blocks, by reading the logical block address stored in each of the memory management units for the at least part of the memory;

means for storing different portions of the physical-to-logical address map in different ones of a plurality of buffers;

means for transferring the physical-to-logical address map from the different ones of the plurality of buffers to a volatile memory in a host; and storing the physical-to-logical address map in volatile memory in a host.

13. The storage system of claim 12, wherein the memory comprises a three-dimensional memory.

14. The storage system of claim 12, wherein the storage system comprises a solid state drive (SSD).

* * * * *